United States Patent
Senatro

(10) Patent No.: US 8,303,025 B2
(45) Date of Patent: Nov. 6, 2012

(54) AERODYNAMIC TRUCKING SYSTEMS

(75) Inventor: Richard P. Senatro, Phoenix, AZ (US)

(73) Assignee: Strehl, LLC, Phoenix, AZ (US)

( * ) Notice: Subject to any disclaimer, the term of this patent is extended or adjusted under 35 U.S.C. 154(b) by 0 days.

(21) Appl. No.: 13/117,891

(22) Filed: May 27, 2011

(65) Prior Publication Data

US 2012/0074728 A1    Mar. 29, 2012

Related U.S. Application Data

(60) Provisional application No. 61/349,183, filed on May 27, 2010, provisional application No. 61/374,572, filed on Aug. 17, 2010.

(51) Int. Cl.
*B62D 35/00* (2006.01)
(52) U.S. Cl. .................. 296/180.4; 296/180.1; 180/903
(58) Field of Classification Search .............. 296/180.1, 296/180.2, 180.3, 180.4, 181.2; 180/903; 105/1.1; 280/159, 859
See application file for complete search history.

(56) References Cited

U.S. PATENT DOCUMENTS

| | | |
|---|---|---|
| 4,611,847 A | 9/1986 | Sullivan |
| 4,746,160 A | 5/1988 | Wiesemeyer |
| 5,280,990 A | 1/1994 | Rinard |
| 6,079,769 A | 6/2000 | Fannin et al. |
| 6,644,720 B2 | 11/2003 | Long et al. |
| 6,837,536 B1 | 1/2005 | Schwartz |
| 6,974,178 B2 | 12/2005 | Ortega et al. |
| 7,093,889 B2 | 8/2006 | Graham |
| 7,163,258 B2 | 1/2007 | Dyer, II et al. |
| 7,404,592 B2 | 7/2008 | Reiman et al. |
| 7,497,502 B2 | 3/2009 | Wood |
| 7,578,541 B2 | 8/2009 | Layfield et al. |
| 7,604,284 B2 | 10/2009 | Reiman et al. |
| 2006/0152038 A1 | 7/2006 | Graham |
| 2007/0120397 A1 | 5/2007 | Layfield et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2009/0212595 A1 | 8/2009 | Heppel et al. |
| 2009/0212596 A1 | 8/2009 | Reiman et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0264690 A1* | 10/2010 | Brown et al. ............ 296/180.4 |
| 2011/0062749 A1* | 3/2011 | Graham et al. ........... 296/180.4 |

* cited by examiner

*Primary Examiner* — Dennis Pedder
*Assistant Examiner* — Jason S Daniels
(74) *Attorney, Agent, or Firm* — Stoneman Law Patent Group; Martin L. Stoneman; Kyle Liudahl

(57) ABSTRACT

A system of aerodynamic skirt fairings designed to minimize aerodynamic drag and maintain smoother air flow over highway-operated long-haul tractor-trailer vehicles.

33 Claims, 7 Drawing Sheets

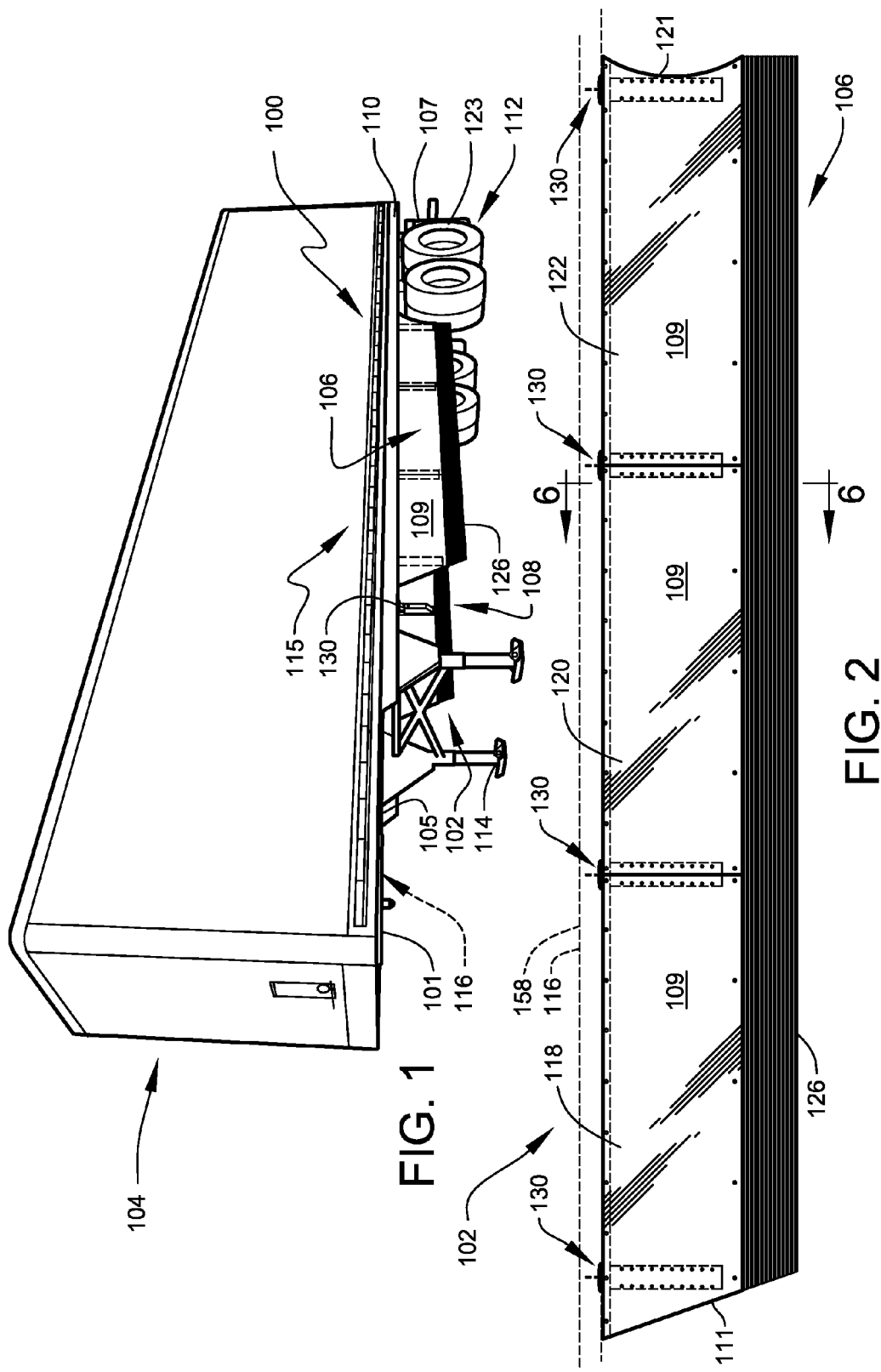

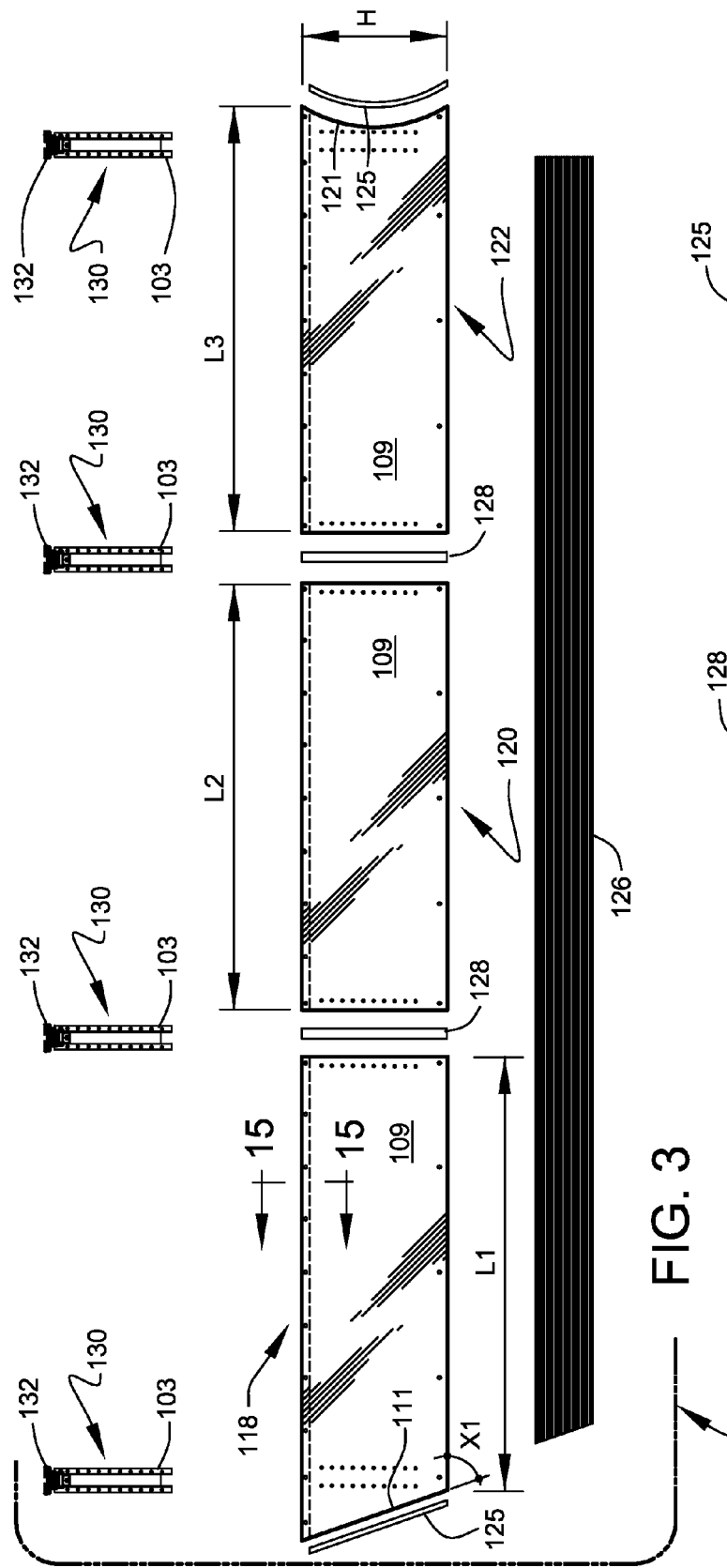

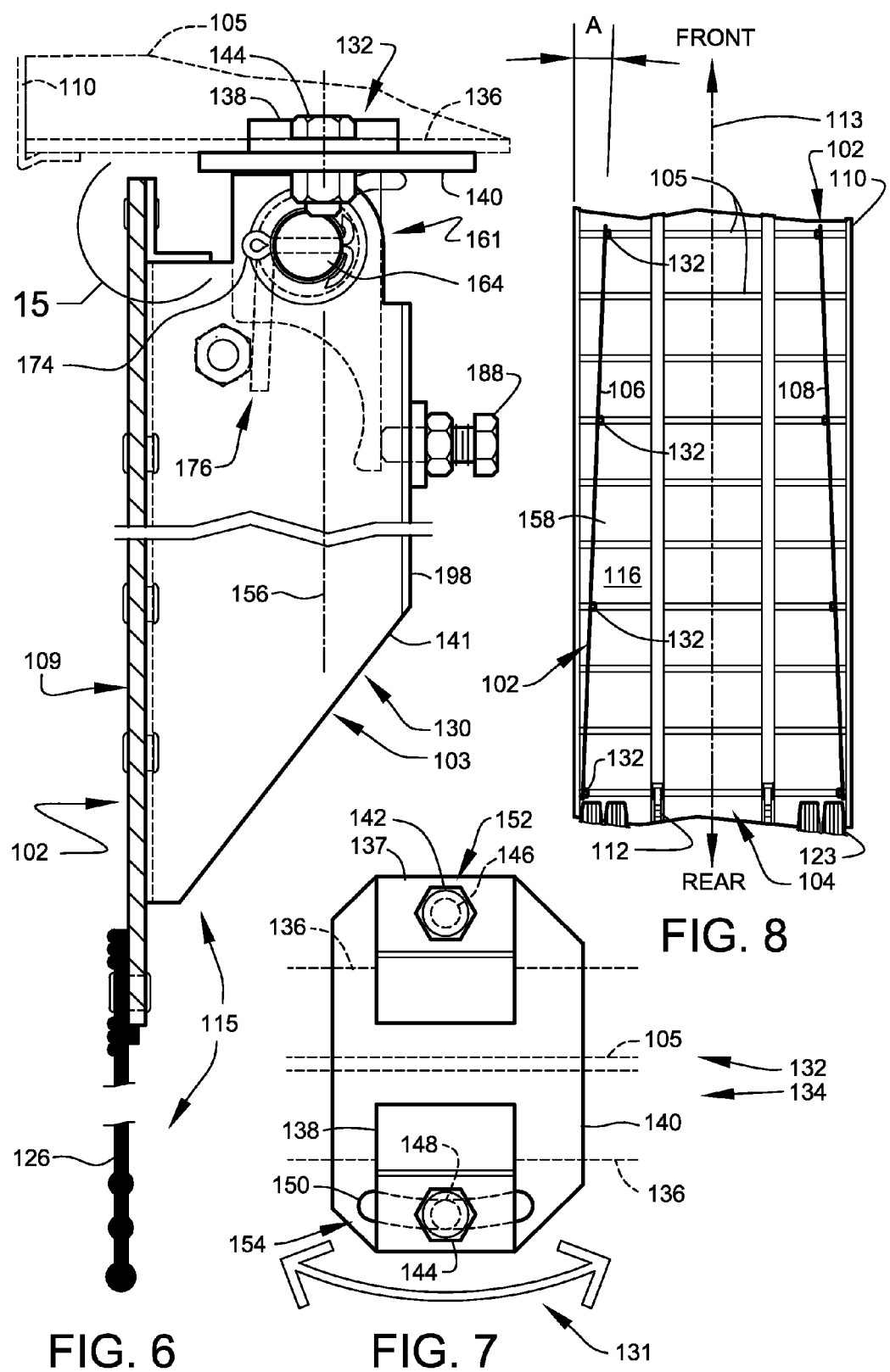

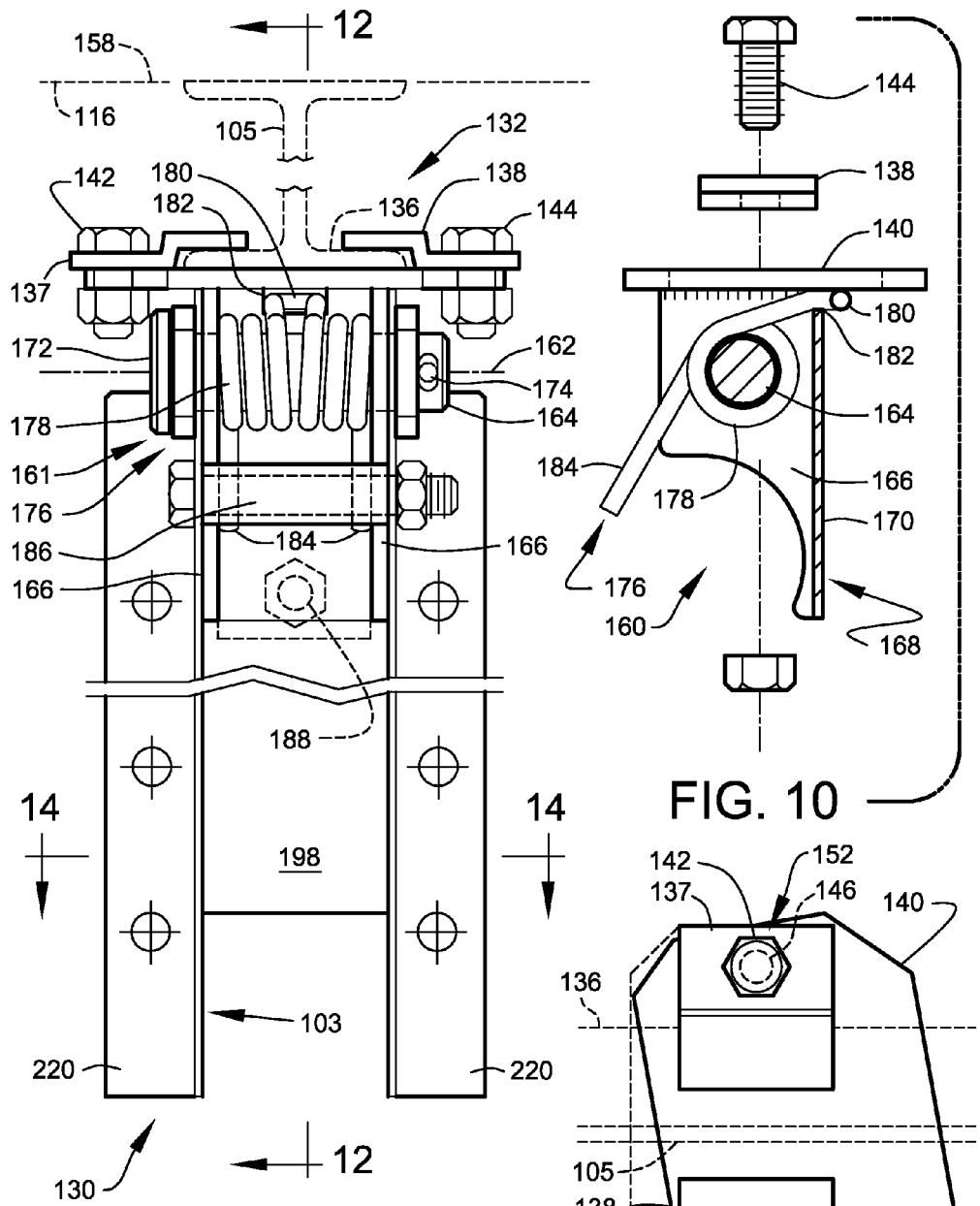
FIG. 9
FIG. 10
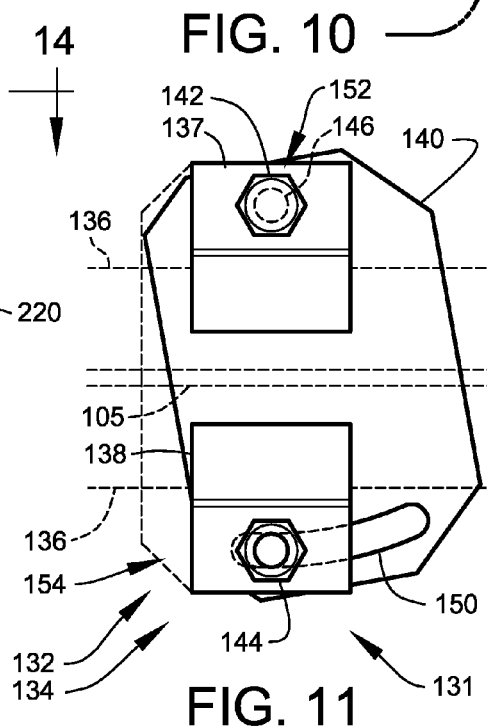
FIG. 11

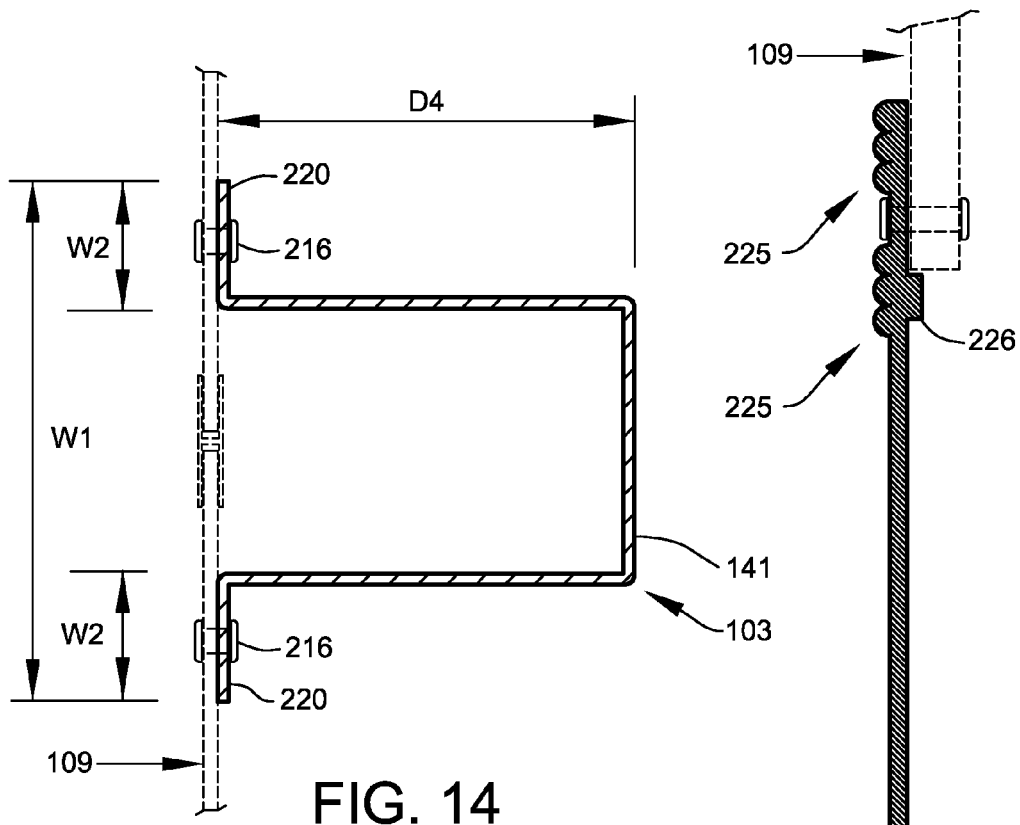
FIG. 14
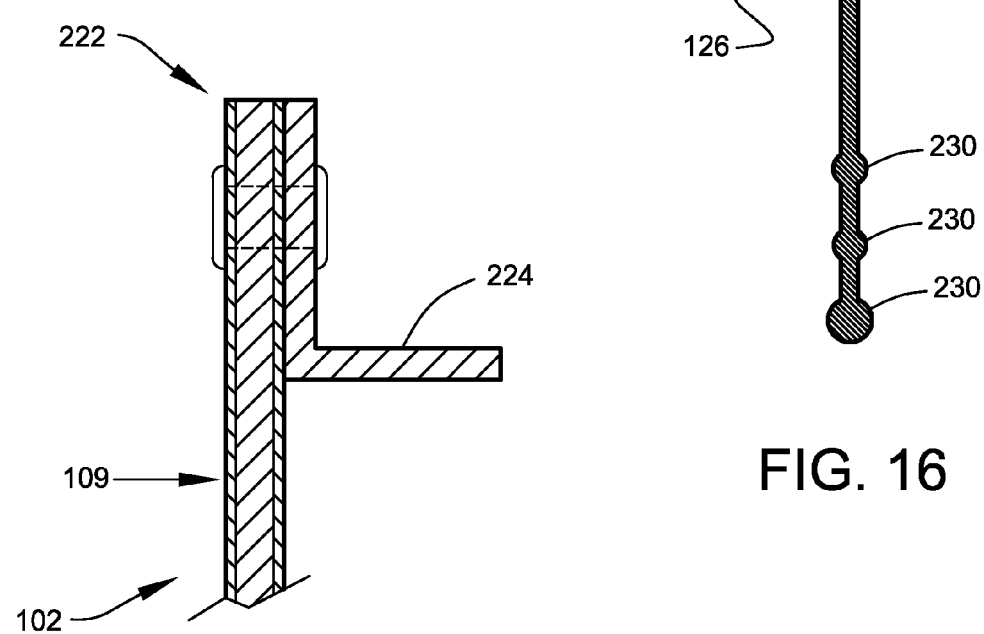
FIG. 15
FIG. 16

AERODYNAMIC TRUCKING SYSTEMS

CROSS-REFERENCE TO RELATED APPLICATION

The present application is related to and claims priority from prior provisional application Ser. No. 61/349,183, filed May 27, 2010, entitled "AERODYNAMIC TRUCKING SYSTEMS"; and, this application is related to and claims priority from prior provisional application Ser. No. 61/374,572, filed Aug. 17, 2010, entitled "AERODYNAMIC TRUCKING SYSTEMS", the contents of all of which are incorporated herein by this reference and are not admitted to be prior art with respect to the present invention by the mention in this cross-reference section.

BACKGROUND

This invention relates to aerodynamic trucking systems. More particularly, this invention relates to providing a system of aerodynamic apparatus designed to minimize aerodynamic drag and maintain smoother air flow over highway-operated vehicles, particularly long-haul tractor-trailer vehicles.

Most large long-haul cargo trailers exhibit less than optimal aerodynamic performance during highway operation. At highway speeds, conventional trailers develop a substantial amount of turbulent airflow in the region between the axles below the trailer box. This turbulence results in significant aerodynamic drag, increasing both fuel consumption and Nitrogen Oxide (NOx) emissions at the motorized towing vehicle. Clearly, a need exists for systems and methods to improve the aerodynamic performance of large long-haul trailers.

OBJECTS AND FEATURES OF THE INVENTION

A primary object and feature of the present invention is to provide a system overcoming the above-mentioned problems. It is a further object and feature of the present invention to provide such a system to improve the aerodynamic performance of wheeled cargo haulers, especially large long-haul trailers, primarily through the use of advanced trailer skirting attachable beneath a lower, longitudinal edge of the trailer. It is another object and feature of the present invention to provide such a system that can be retrofitted to a wide range of trailer configurations and is adjustable to accommodate the aerodynamic requirement of specific tractor-trailer combination. It is an additional object and feature of the present invention to provide such a system that can be provided as a new equipment option from a trailer manufacturer.

It is a further object and feature of the present invention to provide such a system that has negligible impact on normal hauling operations of the tractor-trailer rig. It is another object and feature of the present invention to provide such a system that requires minimal maintenance once installed. It is a further object and feature of the present invention to provide such a system that provides a relatively quick return on investment. It is a further object and feature of the present invention to provide such a system that is SMARTWAY® certified as an advanced skirt while meeting California Air Resources Board (CARB) requirements.

A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a cargo trailer system, relating to supporting at least one air-flow director from at least one cargo-supporting platform configured to support cargo during wheeled transport, comprising: at least one support, attachable to the cargo-supporting platform, structured and arranged to support the at least one air-flow director; wherein such at least one support comprises at least one position-adjuster structured and arranged to positionally adjust the at least one air-flow director, with respect to the at least one cargo-supporting platform, when the at least one cargo-supporting platform and the at least one air-flow director are attached with such at least one support; wherein such at least one position-adjuster comprises multiple-adjuster types structured and arranged to provide multiple positional adjustments of the at least one air-flow director with respect to the at least one cargo-supporting platform; and wherein the multiple positional adjustments comprise at least four different positional-adjustment types.

Moreover, it provides such a cargo trailer system wherein at least one of such multiple-adjuster types comprises: at least one platform attacher structured and arranged to attach such at least one support with the at least one cargo-supporting platform; and at least one support-position translator structured and arranged to assist positional translation of such at least one support with respect to the at least one cargo-supporting platform; wherein such at least one support-position translator comprises at least one freedom of movement generally parallel to the at least one cargo-supporting platform. Additionally, it provides such a cargo trailer system wherein at least one of such multiple-adjuster types comprises: at least one platform attacher structured and arranged to attach such at least one support with the at least one cargo-supporting platform; and at least one first support rotator structured and arranged to assist rotation of such at least one support with respect to such at least one platform attacher; wherein such at least one first support rotator comprises at least one rotational axis perpendicular to the at least one cargo-supporting platform.

Also, it provides such a cargo trailer system wherein at least one of such multiple-adjuster types comprises: at least one platform attacher structured and arranged to attach such at least one support with the at least one cargo-supporting platform; at least one second support rotator structured and arranged to rotate such at least one support, with respect to such at least one platform attacher; and at least one spring biaser structured and arranged to spring bias such at least one support to place the at least one air-flow director in the at least one useful aerodynamic rest-position relative to the at least one cargo-supporting platform; wherein such at least one second support rotator comprises at least one rotational axis parallel to the at least one cargo-supporting platform; and wherein such at least one second support rotator is structured and arranged to permit at least one rotation of such at least one support away from the at least one useful aerodynamic rest-position, in response to at least one force above a selected force level applied to the at least one air-flow director.

In addition, it provides such a cargo trailer system wherein at least one of such multiple-adjuster types comprises at least one support rotator adjuster structured and arranged to assist rotational adjustment of such at least one support, about the at least one rotational axis generally parallel to the at least one cargo-supporting platform, to such at least one useful aerodynamic rest-position. And, it provides such a cargo trailer system further comprising: at least one support-position translator structured and arranged to assist positional translation of such at least one support with respect to the at least one cargo-supporting platform; wherein such at least one support-position translator comprises at least one freedom of movement generally parallel to the at least one cargo-supporting platform. Further, it provides such a cargo trailer system further comprising: at least one first support rotator structured and arranged to assist rotation of such at least one support with respect to such at least one platform attacher; wherein such at least one first support rotator comprises at least one rotational axis perpendicular to the at least one cargo-supporting platform. Even further, it provides such a cargo trailer system wherein such at least one platform attacher comprises at least one clamping assembly structured and arranged to assist adjustable clamping of such at least one platform attacher to at least one structural member of the at least one cargo-supporting platform. Moreover, it provides such a cargo trailer system wherein such at least one clamping assembly comprises at least one first clamping member and at least one second clamping member, each one structured and arranged to form at least one clamped engagement with at least one flanged portion of the at least one structural member.

Additionally, it provides such a cargo trailer system wherein such at least one first support rotator comprises: at least one first threaded tensioner structured and arranged to threadably tension such at least one first clamping member to at least one clamped engagement with the at least one flanged portion of the at least one structural member; at least one second threaded tensioner structured and arranged to threadably tension such at least one second clamping member to at least one other clamped engagement with the at least one flanged portion of the at least one structural member; wherein such at least one first threaded tensioner occupies at least one hinge position with respect to such at least one second threaded tensioner; wherein such at least one second threaded tensioner occupies at least one pivot position with respect to such at least one hinge position; wherein positioning of such first threaded tensioner and such at least one second threaded tensioner assists rotation of such at least one support about the at least one rotational axis perpendicular to the at least one cargo-supporting platform; and wherein such rotation permits positioning of the air-flow director longitudinally angled with respect to the at least one cargo-supporting platform. Also, it provides such a cargo trailer system wherein such at least one support-position translator comprises such at least one clamping assembly.

In addition, it provides such a cargo trailer system wherein at least one adjustable portion of such at least one support comprises at least one rigid channel structured and arranged to rigidly support the at least one air-flow director. And, it provides such a cargo trailer system wherein such at least one first support rotator further comprises: fixed to such at least one platform attacher in an orientation coaxial with the rotational axis perpendicular to the at least one cargo-supporting platform, at least one pivot bar; wherein such at least one rigid channel is pivotally engaged on such at least one pivot bar; wherein such at least one spring biaser comprises at least one helical-type torsion spring structured and arranged to apply at least one spring force concurrently to such at least one platform attacher and such at least one rigid channel to bias such at least one rigid channel toward at least one position orienting the at least one air-flow director in the at least one useful aerodynamic rest-position.

Further, it provides such a cargo trailer system wherein such at least one support rotator adjuster comprises: at least one threaded member threadably engaged within such at least one rigid channel; wherein such at least one threaded member comprises at least one proximal end and at least one distal end wherein such at least one distal end engages such at least one platform attacher when such at least one rigid channel is biased toward at least one position orienting the at least one air-flow director in the at least one useful aerodynamic rest-position; wherein a rotation of such at least one threaded member produces at least one rotational adjustment of such at least one rigid channel, about the at least one rotational axis generally parallel to the at least one cargo-supporting platform; and wherein such at least one rotational adjustment of such at least one rigid channel assists in optimizing placement of such at least one air-flow director in the at least one useful aerodynamic rest-position by angular adjustment of such at least one air-flow director relative to the at least one cargo-supporting platform. Even further, it provides such a cargo trailer system further comprising such at least one air-flow director. Moreover, it provides such a cargo trailer system wherein such at least one air-flow director comprises at least one planar panel structured and arranged to direct away from an under portion of the at least one cargo-supporting platform, a flow of air passing adjacent the at least one cargo-supporting platform.

Additionally, it provides such a cargo trailer system wherein such at least one air-flow director comprises: at least three planar panels each one structured and arranged to be supported from the cargo-supporting platform by at least two of such at least one supports; wherein such at least three planar panels, when supported in series from the cargo-supporting platform, direct away from an under portion of the at least one cargo-supporting platform, a flow of air passing adjacent the at least one cargo-supporting platform. Also, it provides such a cargo trailer system further comprising: at least one resilient deflection member structured and arranged to resiliently deflect under force loading; wherein such at least one resilient deflection member extends generally continuously along a bottom portion of such at least one planar panel. In addition, it provides such a cargo trailer system wherein such at least one resilient deflection member further comprises at least one synthetic rubber comprising at least one air-smoothing projection structure and arranged to assist in smoothing airflow along the surface of such at least one resilient deflection member.

In accordance with another preferred embodiment hereof, this invention provides a cargo trailer system, relating to supporting at least one air-flow director from at least one cargo-supporting platform configured to support cargo during wheeled transport, comprising: at least one support, attachable to the cargo-supporting platform, structured and arranged to support the at least one air-flow director; wherein such at least one support comprises at least one position-adjuster structured and arranged to positionally adjust the at least one air-flow director, with respect to the at least one cargo-supporting platform, when the at least one cargo-supporting platform and the at least one air-flow director are attached with such at least one support; wherein such at least one position-adjuster comprises at least one platform attacher structured and arranged to attach such at least one support means with the at least one cargo-supporting platform, and at least one first support rotator structured and arranged to assist rotation of such at least one support with respect to such at least one platform attacher; wherein such at least one first support rotator comprises at least one rotational axis perpendicular to the at least one cargo-supporting platform; and wherein the multiple positional adjustments comprise at least four different positional-adjustment types.

In accordance with another preferred embodiment hereof, this invention provides a cargo trailer system, relating to supporting at least one air-flow director from at least one cargo-supporting platform configured to support cargo during wheeled transport, comprising: support means, attachable to the cargo-supporting platform, for supporting the at least one air-flow director; wherein such support means comprises position-adjuster means for positional adjustment of the at least one air-flow director, with respect to the at least one cargo-supporting platform, when the at least one cargo-supporting platform and the at least one air-flow director are attached with such support means; wherein such position-adjuster means comprises multiple-adjuster type means for multiple positional adjustments of the at least one air-flow director with respect to the at least one cargo-supporting platform; and wherein the multiple positional adjustments comprise at least four different positional-adjustment types.

And, it provides such a cargo trailer system wherein at least one such multiple-adjuster type means comprises: platform attacher means for attaching such support means with the at least one cargo-supporting platform; and support-position translator means for assisting positional translation of such support means with respect to the at least one cargo-supporting platform; wherein such support-position translator means comprises at least one freedom of movement generally parallel to the at least one cargo-supporting platform. Further, it provides such a cargo trailer system wherein at least one such multiple-adjuster type means comprises: platform attacher means for attaching such support means with the at least one cargo-supporting platform; and first support rotator means for rotating such support means with respect to such platform attacher means; wherein such first support rotator means comprises at least one rotational axis perpendicular to the at least one cargo-supporting platform.

Even further, it provides such a cargo trailer system wherein at least one such multiple-adjuster type means comprises: platform attacher means for attaching such support means with the at least one cargo-supporting platform; and second support rotator means for rotating such support means, with respect to such platform attacher means; wherein such second support rotator means comprises at least one rotational axis parallel to the at least one cargo-supporting platform, and spring biaser means for spring biasing such support means toward at least one ideal aerodynamic rest-position relative to the at least one cargo-supporting platform. Even further, it provides such a cargo trailer system wherein at least one such multiple-adjuster type means comprises support rotator adjuster means for assisting rotational adjustment of such support means, about the at least one rotational axis generally parallel to the at least one cargo-supporting platform, to such at least one ideal aerodynamic rest-position. In accordance with a preferred embodiment hereof, this invention provides each and every novel feature, element, combination, step and/or method disclosed or suggested by this patent application.

BRIEF DESCRIPTION OF THE DRAWINGS

FIG. 1 shows left-side perspective view, illustrating an advanced aerodynamic skirt fairing, mounted in a preferred operable position adjacent a cargo trailer, according to a preferred embodiment of the present invention.

FIG. 2 shows an elevational view, illustrating left-side components of the advanced aerodynamic skirt fairing, demounted from the cargo trailer, according to the preferred embodiment of FIG. 1.

FIG. 3 shows an exploded side view, illustrating left-side components of the advanced aerodynamic skirt fairing, according to the preferred embodiment of FIG. 1.

FIG. 4 shows a cross-sectional view through a panel-to-panel trim component of both the left-side components and right-side components of the advanced aerodynamic skirt fairing of FIG. 1.

FIG. 5 shows a cross-sectional view through a terminating trim component of both the left-side components and the right-side components of the advanced aerodynamic skirt fairing of FIG. 1.

FIG. 6 shows the sectional view 6-6 of FIG. 2, further illustrating the preferred support assembly of the advanced aerodynamic skirt fairing, according to the preferred embodiment of FIG. 1.

FIG. 7 shows a top view, illustrating an adjustable mounting plate, of a panel support post of the preferred support assembly of FIG. 8, according to the preferred embodiment of FIG. 1.

FIG. 8 shows a partial bottom view, of skirt components of the left-side components and the right-side components of the advanced aerodynamic skirt fairing, mounted to the underside of the cargo trailer at a non-parallel angle, relative to the longitudinal axis of the cargo trailer, according to a preferred embodiment of the present invention.

FIG. 9 shows a front view of the adjustable mounting plate and the panel support post of the advanced aerodynamic skirt fairing, according to the preferred embodiment of FIG. 1.

FIG. 10 shows a side view, of a subassembly of the adjustable mounting plate and panel support post of FIG. 10.

FIG. 11 shows a top view, illustrating the adjustable mounting plate, adjusted to a non-parallel angle, relative to the longitudinal axis of the cargo trailer, according to a preferred embodiment of the present invention.

FIG. 14 is a cross-sectional view, through the panel support post of FIG. 9.

FIG. 15 is a partial cross-sectional view, through a panel the advanced aerodynamic skirt fairing, according to the preferred embodiment of FIG. 1.

FIG. 16 is a cross-sectional view, through a resilient base member of the advanced aerodynamic skirt fairing, according to the preferred embodiment of FIG. 1.

Figure 12:
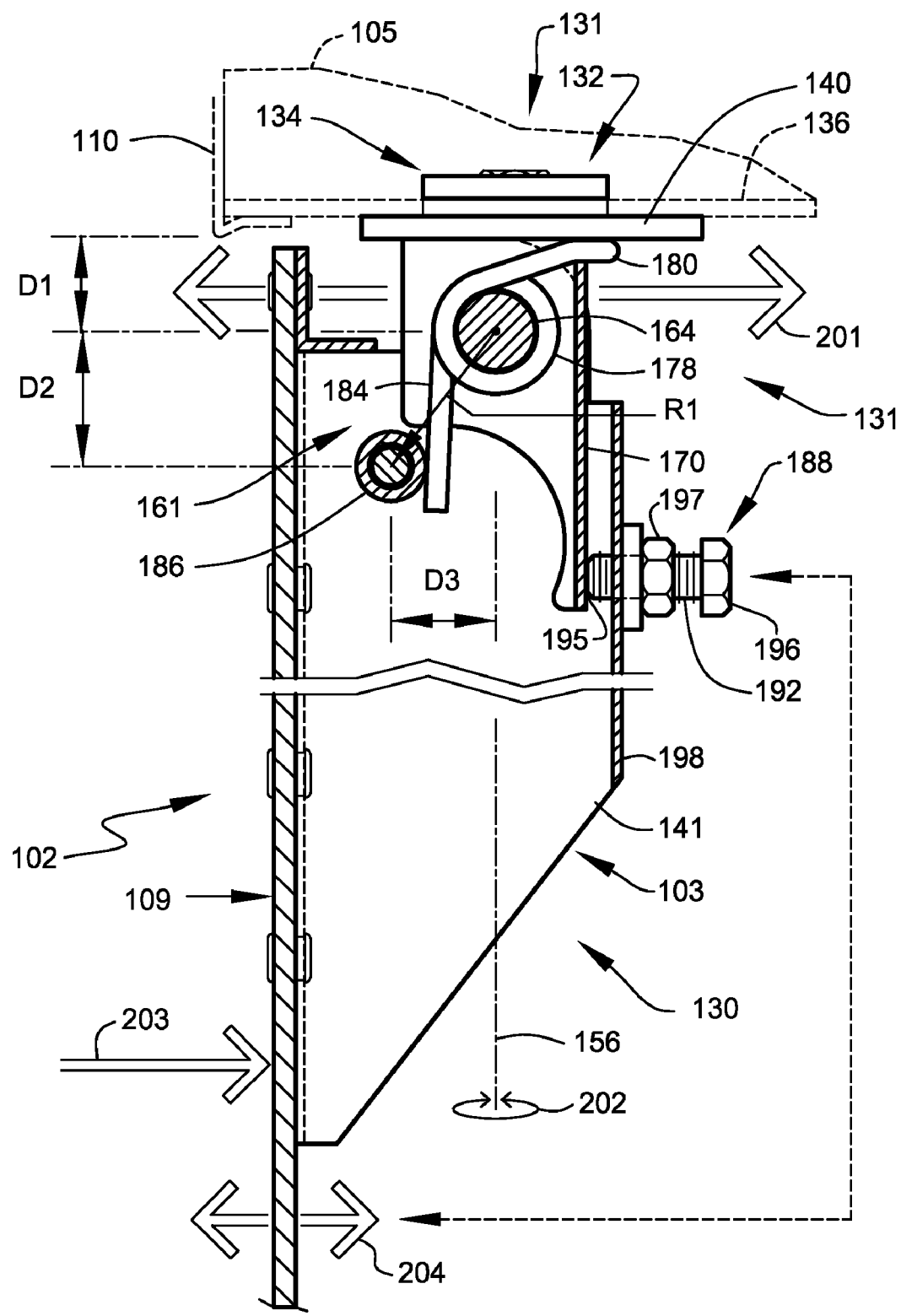
FIG. 12 shows a partial side view, diagrammatically illustrating ranges of adjustment provided by the preferred support assembly, according to the preferred embodiment of FIG. 1.

DETAILED DESCRIPTION OF THE BEST MODES AND PREFERRED EMBODIMENTS OF THE INVENTION

Aerodynamic trucking system 100 preferably comprises a group of system embodiments designed to improve the aerodynamic performance of wheeled cargo haulers at speed, particularly large road-going trailers serving long-haul cargo transport operations. The fuel efficiency of a motor-driven vehicle is closely related to the aerodynamic configuration of the vehicle, particularly with respect to the amount of air turbulence generated during movement of the vehicle through the air. The greater the air turbulence created by the vehicle the greater the resistance, and the more fuel required to move the vehicle.

Preferred embodiments of the aerodynamic trucking system 100 preferably function to manage airflow around and under a semi-type cargo trailer, with the achieved goal of significantly reducing aerodynamic turbulence during operation. Testing of the system embodiments showed a significant reduction in turbulent airflow in and around the trailer, resulting in a corresponding reduction of aerodynamic drag, which produced both an increase in fuel economy and reduction of Nitrogen Oxide (NOx) emissions at the motorized tractor towing the trailer.

Referring to the drawings, FIG. 1 shows left-side perspective view, illustrating preferred left-side components 106 and a portion of the preferred right-side components 108 of an advanced aerodynamic skirt fairing 102, mounted in a preferred operable position adjacent the underside of a van-type cargo trailer 104, according to one preferred embodiment of the present invention. FIG. 2 shows an elevational view, illustrating the left-side components 106 of aerodynamic skirt fairing 102, demounted from cargo trailer 104, according to the preferred embodiment of FIG. 1. It should be noted that the structures and arrangements of the depicted left-side components 106 are a mirror of the right-side components 108; therefore, only one set of aerodynamic skirt fairings will be described herein. It is noted that the drawings and descriptions of the left-side components 106 are equally applicable to the mountable embodiments at both sides of cargo trailer 104.

As generally illustrated in FIG. 1, undercarriage 101 of a conventional cargo trailer is comprised of groupings of various drag-producing components, which generally reside below a cargo-supporting floor deck 116 (at least embodying herein at least one cargo-supporting platform), customarily having a rectangular shape, as shown. The drag-producing components of a semi-type cargo trailer undercarriage customarily include longitudinal and transverse structural support members 105 (see also FIG. 8), rear axles 112, brake components (not shown), mud flaps 107, etc. Each aerodynamic skirt fairing 102 (at least embodying herein at least one air-flow director) preferably functions to direct air away from the central regions of the trailer undercarriage 101, which contain the majority of such drag-producing components. Such directional control of airflow during transport operations preferably reduces the drag-producing interactions between the air and the above-noted structures. More specifically, aerodynamic skirt fairings 102 of aerodynamic trucking system 100 are preferably designed to minimize aerodynamic drag by promoting laminar air flow along the sides and underneath cargo trailer 104.

Despite a general conformity of van-type trailer designs within the trailer industry, variations exist between the offerings of the various trailer manufacturers. The preferred embodiments of aerodynamic trucking system 100 are preferably designed to be universally adaptable to most conventional semi-type cargo trailers. To accommodate specific aerodynamic variations within the various trailer configurations, each aerodynamic skirt fairing 102 is preferably designed to be adjustably mountable to the undercarriage 101 of cargo trailer 104. The preferred integration of an adjustment feature within the system embodiments allows an installer to optimize the aerodynamic performance of an installed aerodynamic skirt fairing 102 based on the unique aerodynamic requirements of a specific vehicle platform.

Preferably, each aerodynamic skirt fairing 102 comprises a substantially planar external face 109 that is essentially solid (that is, impermeable to the passage of air). Each aerodynamic skirt fairing 102 is preferably mounted adjacent one of the two longitudinal lower side rails 110 of the trailer, as shown. The leading edge 111 of each aerodynamic skirt fairing 102 is preferably located in a position just aft of the forward landing gear 114, as shown. Both aerodynamic skirt fairings 102 preferably extend rearward, preferably terminating at respective points just ahead of rear axles 112, as shown. Such an arrangement was found to be effective in reducing drag by substantially "shading" the rear axles 112 from the airflow moving past cargo trailer 104.

In general, the preferred placements of aerodynamic skirt fairings 102 are both symmetrical and non-parallel with respect to longitudinal axis 113 of cargo-supporting floor deck 116, as best illustrated in the underside view of FIG. 8. More specifically, the aerodynamic performance of most trailer installations is optimized by aligning the two aerodynamic skirt fairings 102 along a set of symmetrically opposing lines that are preferably oriented to converge at a point on longitudinal axis 113 forward of the trailer. Each aerodynamic skirt fairings 102 preferably adjusted to comprise an angle "A" of between about ½ and about 8 degrees with respect to longitudinal axis 113. This preferred arrangement "pinches" together the forward ends of two fairings, as shown, and was found in practice to improve the aerodynamic performance of most trailers when so arranged. Upon reading this specification, those with ordinary skill in the art will now appreciate that, under appropriate circumstances, considering such issues as cost, user preference, etc., other fairing arrangements such as, for example, providing fairings placed at greater angular orientations, providing fairings extending approximately a full length of a trailer, providing fairings having one or more non-planar portions, providing fairings having air passages, vents, or other air-permeable portions, etc., may suffice.

FIG. 3 shows an exploded side view, illustrating left-side components 106 of aerodynamic skirt fairing 102, according to the preferred embodiment of FIG. 1. Both right-side components 108 and left-side components (each one at least embodying herein at least one air-flow director) preferably comprise an upper front panel 118, at least one upper center panel(s) 120, and an upper rear panel 122, as shown. A continuous (single piece) flexible lower skirt 126 preferably spans the length of the assembled upper panels of aerodynamic skirt fairing 102, as shown. The flexible lower skirt 126 is preferably fixed firmly to the lower edge of each of the upper panels. The preferred design of flexible lower skirt 126 was developed specifically for use within the preferred embodiment of aerodynamic trucking system 100, and was found to be instrumental in achieving the high levels of drag reduction exhibited by the system. In addition, flexible lower skirt 126 preferably functions to improve impact resistance within the fairing by providing a region of resilient deflection at the base of the skirt. This preferred arrangement protects the less flexible upper panels from perpendicular impact while allowing the base of the fairing to flex outwardly to release potentially damaging objects. One highly preferred configuration of flexible lower skirt 126 is depicted in FIG. 16.

In one preferred embodiment of the system, upper front panel 118, upper center panel 120, and upper rear panel 122 each comprise a vertical height "H" of about 24 inches. In such a preferred embodiment of the system, upper front panel 118 comprises a preferred maximum length L1 of about eight feet, upper center panel 120 comprises a preferred maximum length L2 of about eight feet, and upper rear panel 122 comprises a preferred maximum length L3 of about eight feet. Upon reading this specification, those with ordinary skill in the art will now appreciate that, under appropriate circumstances, considering such issues as trailer length, material preference, etc., other dimensional arrangements such as, for example, altering the length of one or more panel portions to accommodate alternate trailer configurations, etc., may suffice.

To augment aerodynamic performance of the overall fairing assembly, leading edge 111 of front panel 118 is preferably canted rearward at a preferred inclination X1 of preferably about 68 degrees from horizontal, as shown. The trailing edge 121 of rear panel 122 is preferably formed to a convex curve that generally corresponds to the external shape of the tires 123 of rear axles 112, as shown. The preferred arcuate profile of trailing edge 121 allows the aft termination of the fairing assembly to be located in a preferred position closely adjacent the forward outboard tires 123 of rear axles 112, without the risk of contact interference. A curve having a preferred slope of about 37 degrees was found to appropriately match trailing edge 121 to the outer diameter of a standard semi-trailer tire. Upon reading this specification, those with ordinary skill in the art will now appreciate that, under appropriate circumstances, considering such issues as cost, user preference, trailer configuration, etc., other termination arrangements such as, for example, alternate angles and/or slopes, non-radius terminations, etc., may suffice.

Each upper panel is preferably constructed from industry-standard materials selected to comprise a structural rigidity sufficient to support the required air deflection function, while offering a level of mechanical flexibility sufficient to deflect resiliently under small to moderate impact loads, thereby reducing the need for frequent panel repair or replacement due to permanent impact damage. Preferred materials suitable for use in the construction of front panel 118, center panel(s) 120, and rear panel 122 preferably include polyester-coated steel laminated to a low density polyethylene (LPDE) core with a preferred material thickness of about ⅛ inch. Upon reading this specification, those with ordinary skill in the art will now appreciate that, under appropriate circumstances, considering such issues as cost, user preference, etc., other material selections such as, for example, aluminum, molded polymer panels, polymer-based composite panels, fiber-reinforced polymer panels, etc., may suffice.

A panel-to-panel trim connector 128 is preferably provided to cover the gap between adjacent panel sections, as shown. FIG. 5 shows a cross-sectional view through a preferred H-shaped panel-to-panel trim connector 128 of both the left-side components 106 and right-side components 108. Each panel-to-panel trim connector 128 is preferably constructed of a durable and lightweight material, with aluminum being most preferred. Panel-to-panel trim connector 128 preferably comprises a material thickness of about 1/32 inch, and is preferably powder coated to match the finish of external face 109. In a similar manner, both the leading edge 111 of front panel 118 and trailing edge 121 of rear panel 122 are preferably finished with a ¼-inch "U"-shaped edge trim 125, as generally illustrated in the cross-sectional depiction of FIG. 6.

The air-directing upper panels of aerodynamic skirt fairing 102 are preferably supported from the underside structures of cargo trailer 104 by a set of panel supports 130, as shown (at least embodying herein at least one support, attachable to the cargo-supporting platform, structured and arranged to support the at least one air-flow director). Each panel support 130 preferably comprises a downwardly-projecting support member 103 pivotally coupled to an upper mount 132. Each support member 103 preferably comprises a rigid "hat-shaped" channel 141, preferably formed from at least one durable material, most preferably steel. To reduce both aerodynamic drag and visual exposure, the base of channel 141 is angled upwardly at preferably about 45 degrees, as shown. A preferred sectional profile of rigid channel 141 is shown in FIG. 14.

FIG. 6 shows the sectional view 6-6 of FIG. 2, illustrating a single example of panel support 130, according to the preferred embodiment of FIG. 1. Upper mount 132 is preferably configured to be adjustably mounted to a transverse structural support member 105 of cargo trailer 104, as shown. Each articulated support member 103 is preferably designed to be adjustable along multiple linear and rotational axes to facilitate the above-noted optimized aerodynamic positioning of respective aerodynamic skirt fairings 102 within a specific tractor-trailer setup (at least embodying herein at least one position-adjuster structured and arranged to positionally adjust the at least one air-flow director, with respect to the at least one cargo-supporting platform, when the at least one cargo-supporting platform and the at least one air-flow director are attached with such at least one support; and at least embodying herein wherein such at least one position-adjuster comprises multiple-adjuster types structured and arranged to provide multiple positional adjustments of the at least one air-flow director with respect to the at least one cargo-supporting platform). Each articulated support member 103 preferably comprises at least four different positional-adjustment types, as further described below.

FIG. 7 shows a top view, illustrating clamping assembly 134 of upper mount 132, according to the preferred embodiment of FIG. 1. Specific reference is now made to FIG. 7 with continued reference to the prior illustrations. Clamping assembly 134 is preferably configured to firmly clamp upper mount 132 to a lower horizontal flange 136 of structural support member 105, as diagrammatically indicated by the dashed-line depiction of the accompanying illustrations (at least embodying herein at least one clamping assembly structured and arranged to assist adjustable clamping of such at least one platform attacher to at least one structural member of the at least one cargo-supporting platform). Clamping assembly 134 preferably comprises a pair of upper clamping members identified herein as first clamping member 137 and second clamping member 138, as shown. First clamping member 137 and second clamping member 138 are preferably arranged to compressively engage the top of flange 136, as shown. Clamping assembly 134 further preferably comprises a clamping plate 140 that is preferably arranged to engage the underside of flange 136, as shown. Clamping plate 140 is preferably constructed from metallic plate, more preferably, steel plate having a thickness of about one quarter inch.

A first threaded tensioner 142, preferably comprising a threaded bolt and nut, preferably engages both first clamping member 137 and clamping plate 140, as shown. First threaded tensioner 142 is preferably configured to threadably tension first clamping member 137 to at least one clamped engagement with flange 136 of structural support member 105. A second threaded tensioner 144, preferably comprising a threaded bolt and nut, preferably engages both second clamping member 138 and clamping plate 140, as shown. Second threaded tensioner 144 is preferably configured to threadably tension second clamping member 138 to at least one clamped engagement with flange 136.

When both first threaded tensioner 142 and second threaded tensioner 144 are loosened, panel support 130 is free to translate along structural support member 105 in a direction generally parallel to cargo-supporting floor deck 116 and transverse to longitudinal axis 113 (at least embodying herein at least one support-position translator structured and arranged to assist positional translation of such at least one support with respect to the at least one cargo-supporting platform; wherein such at least one support-position translator comprises at least one freedom of movement generally parallel to the at least one cargo-supporting platform). When panel support 130 reaches a selected location along structural support member 105, by the generally horizontal translational adjustment, both first threaded tensioner 142 and second threaded tensioner 144 are preferably tightened to firmly clamp panel support 130 in place. The above-described translational adjustment, preferably enabled by the operation of clamping assembly 134, preferably comprises a first of the four different positional-adjustment types.

Panel support 130 preferably comprises an additional positional adjuster, identified herein as support rotator 131, comprising the first of three rotational adjusters integrated within panel support 130. Support rotator 131 is preferably structured and arranged to enable the rotation of panel support 130 about a rotational axis 156 oriented approximately perpendicular to planar surface 158 (see FIG. 9) of cargo-supporting floor deck 116 (at least embodying herein at least one first support rotator structured and arranged to assist rotation of such at least one support with respect to such at least one platform attacher; wherein such at least one first support rotator comprises at least one rotational axis perpendicular to the at least one cargo-supporting platform). The ability to rotate panel support 130 about rotational axis 156 facilitates the preferred non-orthogonal positioning of aerodynamic skirt fairing 102, and preferably comprises a second of the four different positional-adjustment types.

As best illustrated in the illustrations of FIG. 7 and FIG. 11, first threaded tensioner 142 preferably passes through a set of preferably circular apertures 146 located within first clamping member 137 and one side of clamping plate 140, as shown. Second threaded tensioner 144 preferably passes through a preferably circular aperture 148 located within second clamping member 138 and a preferably arcuate slot 150 located within an opposing side of clamping plate 140, as shown. This preferred arrangement places first threaded tensioner 142 in a hinge position 152 with respect to second threaded tensioner 144, with second threaded tensioner 144 preferably occupying a pivot position 154 with respect to hinge position 152.

FIG. 8 shows a partial bottom view, of left-side components 106 and right-side components 108 of the advanced aerodynamic skirt fairing 102, mounted to trailer undercarriage 101 at non-parallel angles relative to longitudinal axis 113, according to an optimized installation of the present invention. The functions provided by support rotator 131 are preferably enabled by the above-noted arrangements of first threaded tensioner 142, second threaded tensioner 144, and clamping plate 140, which together enable the preferred rotation of the full panel support 130 about rotational axis 156. The preferred rotational adjustability of panel support 130 about rotational axis 156 permits the preferred non-orthogonal positioning of aerodynamic skirt fairing 102, at multiple selected angles with respect to the transverse structural support members 105, without applying undue stress to the connections between upper panels and their respective panel supports 130. This greatly increases the in-service durability of the system, by eliminating the need for the upper panels to twist or flex at their support mountings.

FIG. 9 shows a front view of panel supports 130, according to the preferred embodiment of FIG. 1. FIG. 10 shows a side view, of subassembly 160 of upper mounting assembly 132. Each panel support 130 preferably comprises an additional set of rotational positioners, preferably including support rotator 161 used to assist the upward rotation of articulated support member 103 with respect to upper mounting assembly 132. More specifically, each articulated support member 103 is preferably structured and arranged to be rotatable about a generally horizontal rotational axis 162 that is preferably oriented approximately parallel to planar surface 158 of cargo-supporting floor deck 116 (at least embodying herein at least one second support rotator structured and arranged to rotate such at least one support, with respect to such at least one platform attacher; wherein such at least one second support rotator comprises at least one rotational axis parallel to the at least one cargo-supporting platform). The ability to rotate articulated support member 103 about rotational axis 162 permits aerodynamic skirt fairing 102 to temporarily rotate up and away from physical obstructions impacting the panels, and preferably comprises a third of the four different positional-adjustment types.

In one preferred embodiment of the system, support rotator 161 comprises a cylindrical bar 164 on which articulated support member 103 (at least embodying herein at least one rigid channel) is pivotally engaged, as shown. Cylindrical bar 164 is preferably supported within opposing sidewalls 166 of a "U"-shaped frame 168, which preferably projects downwardly from the lower surface of clamping plate 140, as shown. Frame 168 is preferably constructed from heavy-gauge sheet metal, more preferably sheet steel having a thickness of about seven gauge. Frame 168 also comprises a rear wall 170 that is rigidly fixed to clamping plate 140 along with the opposing sidewalls 166. Preferably, cylindrical bar 164 is removably retained within the opposing sidewalls 166 by means of a fixed head 172 and removable cotter pin 174, as shown.

Each articulated support member 103 is preferably "spring loaded" to bias aerodynamic skirt fairing 102 toward the useful aerodynamic rest-position 115 depicted in FIG. 1. In one preferred embodiment of the system, each panel support 130 comprises an integral spring biaser 176, preferably comprising a helical torsion-type spring 178 preferably engaged over cylindrical bar 164, as shown (at least embodying herein at least one spring biaser structured and arranged to spring bias such at least one support to place the at least one air-flow director in the at least one useful aerodynamic rest-position relative to the at least one cargo-supporting platform; wherein at least one pivot bar is fixed to such at least one platform attacher in an orientation coaxial with the rotational axis perpendicular to the at least one cargo-supporting platform; wherein such at least one rigid channel is pivotally engaged on such at least one pivot bar; and wherein such at least one spring biaser comprises at least one helical-type torsion spring structured and arranged to apply at least one spring force concurrently to such at least one platform attacher and such at least one rigid channel to bias such at least one rigid channel toward at least one position orienting the at least one air-flow director in the at least one useful aerodynamic rest-position).

Helical torsion-type spring 178 is preferably of a double-spring design (two sets of coils wound in opposite directions around the same center axis and joined by a central connecting leg 180), as shown. Central connecting leg 180 is preferably engaged within slot 182 formed within rear wall 170, as shown. Each end of helical torsion-type spring 178 comprises a projecting leg 184 that preferably engages crossbar 186 of articulated support member 103, as best shown in FIG. 12.

The torque force generated by helical torsion-type spring 178 is preferably applied concurrently to the underside of clamping plate 140 and crossbar 186 of articulated support member 103, as shown. The lower face of clamping plate 140, on which central connecting leg 180 is preferably engaged, is preferably located a vertical distance D1 above the horizontal rotational axis 162 of both cylindrical bar 164 and helical torsion-type spring 178, as shown. The center of crossbar 186 is preferably located a vertical distance D2 below horizontal rotational axis 162 and is preferably shifted a horizontal distance D3 forward of the horizontal rotational axis 162. In one preferred embodiment of the system, D1 comprises a vertical distance of about one inch, D2 comprises a vertical distance of about 1.3 inches, and D3 comprises a horizontal distance of about one inch.

Figure 13:
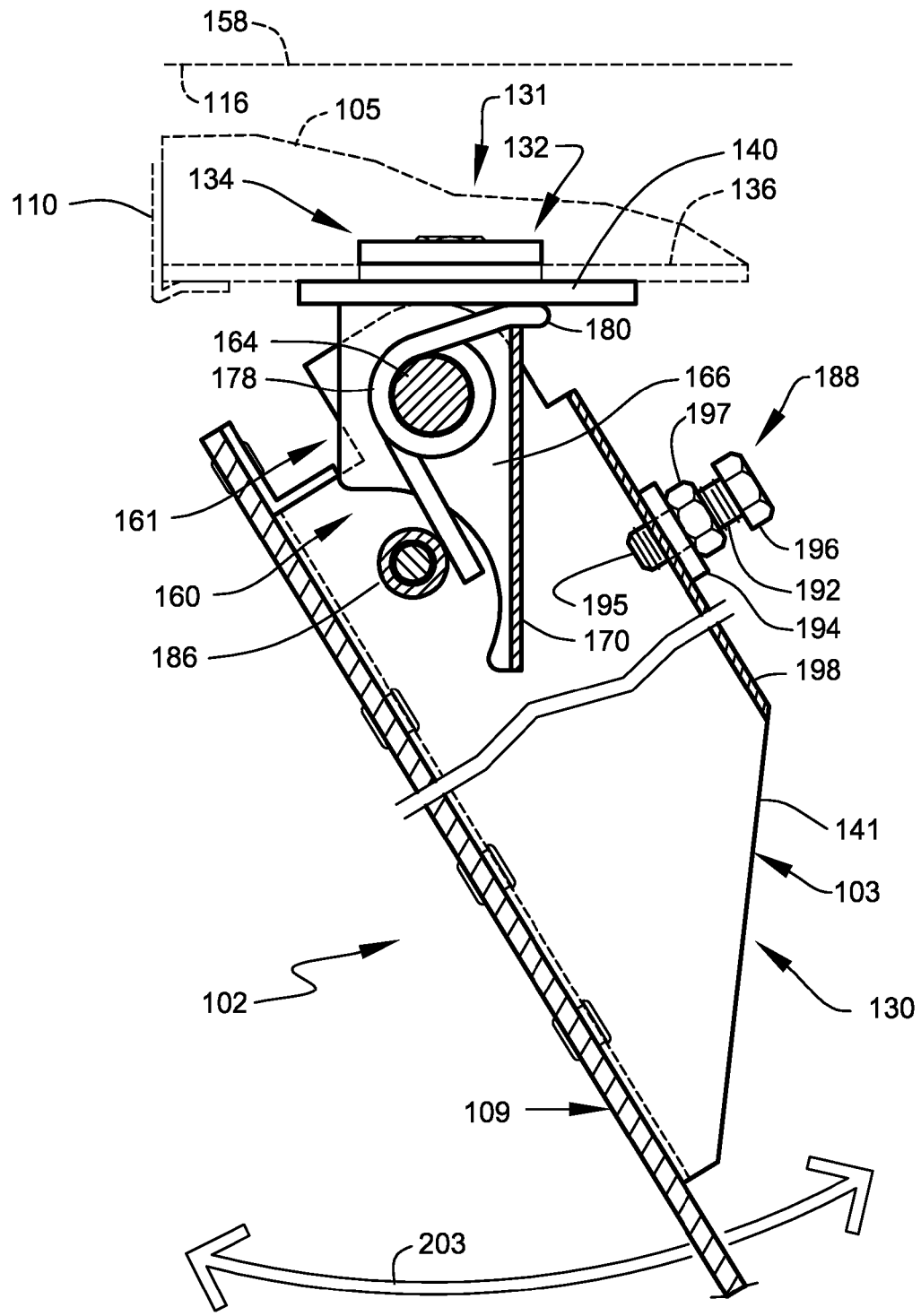
FIG. 13 shows a partial side view, diagrammatically illustrating a freedom of movement provided by the preferred support assembly, according to the preferred embodiment of FIG. 1.

FIG. 12 shows a partial side view, diagrammatically illustrating the integration of spring biaser 176 within panel support 130 and the preferred ranges of adjustment provided by the assembly. FIG. 13 shows a partial side view, diagrammatically illustrating a preferred upward freedom of movement of articulated support members 103, according to the preferred embodiment of FIG. 1. As articulated support member 103 pivots upwardly, the center of crossbar 186 sweeps along an arcuate path having a radius R1 of about 1⅝ inches. Support rotator 131 is preferably configured to permit articulated support member 103 to rotate upwardly, from the selected aerodynamic rest-position 115, with about a 40-degree range of free motion. As best illustrated in FIG. 13, opposing sidewalls 166 are preferably shaped to provide clearance for crossbar 186 during its upward swing.

The mechanical performance of helical torsion-type spring 178 is preferably selected to maintain aerodynamic skirt fairing 102 in the useful aerodynamic rest-position 115 during use, while permitting upward rotation of aerodynamic skirt fairing 102 (comprising the articulated support members 103), from the useful aerodynamic rest-position 115, in response to the application of an impact force above a selected force level. By selecting the appropriate spring force applied by the helical torsion-type springs 178 of support rotator 161, the level of wind loading (or impact loading) required to rotate aerodynamic skirt fairing 102 away from the useful aerodynamic rest-position 115 may be selected (at least embodying herein wherein said at least one second support rotator is structured and arranged to permit at least one rotation of said at least one support away from the at least one useful aerodynamic rest-position, in response to at least one force above a selected force level applied to the at least one air-flow director).

The preferred forward offset distance D3, between horizontal rotational axis 162 and crossbar 186, preferably provides about 27-degrees of initial angular displacement of the projecting legs 184, as shown. This serves to pre-load helical torsion-type spring 178 when the fairing is located in generally vertical aerodynamic rest-position 115, thereby reducing the occurrence of transient vibrations during operation.

A spring preferably providing not more than about 65 inch-pounds of torque resistance, and no less than about 25 inch-pounds of torque resistance is preferred for most installations. More particularly, applicant found a spring providing a torque of about 30 inch-pounds (as a measured average over about a 40-degree range of motion) to be optimal for most installations. This selection was based on the measured spring performance within the geometrical configuration of the preferred embodiment of FIG. 1. Such geometrical configuration preferably comprises the preferred use of four helical torsion-type springs 178 preferably located within four panel supports 130 and a total fairing weight of not more than about 230 pounds.

A preferred double helical spring providing the required spring force preferably comprises two coiled bodies, each one having at least three active coils, as shown, and a wire diameter of about ¼ inch. It was further determined that selection of a spring having an initial torque rating of about 45 inch-pounds eventually produced the more preferred 30 inch-pounds of torque resistance after a short period of dynamic operation. Thus, in preferred practice, springs of the higher initial torque specification are preferably selected for integration within the preferred embodiments of the system. Upon reading this specification, those with ordinary skill in the art will now appreciate that, under appropriate circumstances, considering such issues as cost, user preference, etc., other spring arrangements such as, for example, "L"-shaped sections of spring steel structured and arranged to engage the articulated support member and mounting plate, rubber members, flexible bars, compression springs, tension springs, leaf springs, gas springs, etc., may suffice.

The fourth of the multiple-adjuster types preferably comprises a support rotator adjuster 188 preferably designed to assist fine rotational adjustment of articulated support member 103 about horizontal rotational axis 162. One support rotator adjuster 188 is preferably integrated within each panel support 130 to allow the vertical orientation of aerodynamic skirt fairing 102 to be adjusted to the most beneficial aerodynamic rest-position 115 (thereby addressing hysteresis variations within the springs as well as irregularities in the trailer structure).

Support rotator adjuster 188 preferably comprises threaded member 192 that is rotatably engaged within threaded socket 194 of channel 141. Threaded member 192 preferably comprises a distal end 195, preferably arranged to contact rear wall 170 of subassembly 160 (at least embodying herein at least one platform attacher), and a proximal end 196, preferably comprising a hexagonal head, preferably adapted to receive a wrench or similar tool used to set the depth of thread threaded member 192 within threaded socket 194 by rotational manipulation. A jamb nut 197 is preferably used to maintain the positioning of threaded member 192 within threaded socket 194 once the adjustment is complete.

Distal end 195 is preferably configured to limit the outward pivotal rotation of support member 103 by contacting rear wall 170, as shown. Rotation of threaded member 192 preferably produces fine rotational adjustments in support member 103 about horizontal rotational axis 162 (at least embodying herein at least one rotational axis generally parallel to the at least one cargo-supporting platform) by lengthening or shortening the portion of threaded member 192 situate between rear wall 170 and rear wall 198 of channel 141. This preferred adjustability allows an installer to fine-tune the vertical orientation of the fairing to achieve an optimized aerodynamics, typically by placing the panels in an approximately perpendicular (vertical) position relative to cargo-supporting floor deck 116. When properly adjusted, support member 103 is preferably arranged to orient aerodynamic skirt fairing 102 in the useful aerodynamic rest-position 115 (at least embodying herein wherein rotational adjustment of such at least one rigid channel assists in optimizing placement of such at least one air-flow director in the at least one useful aerodynamic rest-position by angular adjustment of such at least one air-flow director relative to the at least one cargo-supporting platform).

Thus, as diagrammatically illustrated by the directional arrows of FIG. 12, the above-described preferred arrangements of aerodynamic skirt fairing 102 provide four different positional-adjustment types, preferably comprising; the generally horizontal translational adjustment 201 enabled by clamping assembly 134, a first rotational adjustment 202 enabled by support rotator 131 (providing the preferred axial rotation of articulated support member 103 about the generally vertical rotational axis 156), a second rotational adjustment 203 enabled by support rotator 161 (providing the preferred upward pivoting of articulated support member 103 illustrated in FIG. 13), and a third rotational adjustment 204 used to fine-tune the orientation of the fairing, preferably enabled by support rotator adjuster 188.

FIG. 14 is a cross-sectional view, through the preferred rigid channel 141 of articulated support member 103. Channel 141 is preferably designed to appropriately support the weight and dynamic force loads of the wind-deflecting panels of aerodynamic skirt fairing 102 during operation. Each channel 141 preferably comprises a set of mounting flanges 220 on which the upper panels of aerodynamic skirt fairing 102 are affixed. Channel 141 is preferably constructed from heavy-gauge sheet metal, more preferably sheet steel having about a 14-gauge thickness. In a preferred arrangement of the system, channel 141 comprises a member depth D4 of about 3½ inches, an overall width W1 of about 4⅜ inches, and a flange width W2 of about one inch.

The upper panels of aerodynamic skirt fairing 102 are preferably fixed to channel 141 by mechanical fasteners 216, which are preferably secured through the panels and mounting flanges 220, as shown. In one preferred embodiment of the system, mechanical fasteners 216 comprise rivets.

FIG. 15 is a partial cross-sectional view, through the upper peripheral edge 222 of an upper panel of aerodynamic skirt fairing 102, according to the preferred embodiment of FIG. 1. Upper front panel 118, upper center panel 120, and upper rear panel 122 each preferably comprise angle member 224, as shown. Angle member 224 preferably functions to stiffen the upper panel assembly and further assists in supporting the upper panel from articulated support members 103. Angle member 224 preferably comprises a metallic angle, more preferably a 1 inch by 1 inch by ¼-inch thick aluminum angle, mechanically fastened, more preferably riveted to its respective upper panel by a ¼ inch by ¾-inch aluminum rivet.

Dynamic forces applied at the lower region of aerodynamic skirt fairing 102 tend to produce the greatest dynamic actions within the assembly. This is due in part to the preferred geometry of the structure, wherein aerodynamic skirt fairing 102 is, from a force-application perspective, a hinged cantilevered support that must resist bending moments and shear forces resulting from lateral wind loading. Any reduction of turbulence-generated force loads at the base of the fairing (that is, the maximum moment-arm length of the cantilevered support) is highly beneficial in that the overall panel system may comprise lighter and more flexible materials, without exhibiting unstable behavior. Applicant was successful in reducing unwanted dynamic actions within the operating assembly, such as fluttering and similar flow-induced vibration arising out of non-laminar fluid-structure interactions, through the use of the preferred lower skirt 126 described herein.

FIG. 16 is a cross-sectional view, through the resilient lower skirt 126 of aerodynamic skirt fairing 102, according to the preferred embodiment of FIG. 1. The lower skirt 126 is preferably configured to extend uninterrupted along the entire length of aerodynamic skirt fairing 102. The preferred seamless profile of lower skirt 126 was found to assists in reducing air turbulence along the lower region of aerodynamic skirt fairing 102. The preferred uninterrupted lower skirt 126 preferably functions to tie the entire assembly together, so that fluctuating pressure forces acting against any one panel are distributed across the entire assembly. Furthermore, the preferred resilient composition of lower skirt 126 functions as a vibration damper to attenuate vibrations and similar oscillations occurring within the assembly. This makes aerodynamic skirt fairing 102 more stable and thus, more aerodynamic.

A series of semicircular projecting ridges 225 are preferably formed along the upper outboard side of lower skirt 126, as shown. More specifically, a set of six semicircular projecting ridges 225, each having a preferred diameter of about ⅛ inch, are preferably formed within the upper two inches of lower skirt 126. These projecting ridges 225 are substantially linear in conformation and preferably extend longitudinally along the length of the member. Projecting ridges 225 preferably function to protect lower skirt 126 from side impact and stiffen both the skirt and underlying panel assembly on which it is attached.

A series of ball-shaped projections 230 are preferably formed near the base of lower skirt 126, as shown. These ball-shaped projections 230 are substantially linear in conformation and preferably extend longitudinally along the full length of the member. In a preferred embodiment of the system, the lowest ball projection comprises a diameter of about ⅜ inches. A pair of upper ball projections, vertically spaced approximately ¾ inch apart, each preferably comprises diameters of about 9/32.

Ball-shaped projections 230 preferably function to channel air, making the skirt more stable. More specifically, it is believed that integration of the ball-shaped projections 230 within lower skirt 126 effectively smoothes the flow of air across the lower surfaces of aerodynamic skirt fairing 102, preferably reducing the tendency of the flow to separate from the surface of the skirt, which would otherwise give rise to vortex turbulence at one or either side of the member. Promoting laminar flow at the aerodynamic surfaces, by limiting the development of such vortex turbulence, reduces the magnitude of fluctuating pressure forces acting on the assembly, thus reducing the tendency of the fairing to exhibit fluttering or other vibrations during operation. In addition, ball-shaped projections 230 offer a further means for protecting the upper panel from impact when lower skirt 126 comes between a foreign object and the upper panels.

Lower skirt 126 preferably comprises an overall height of about 9½ inches and a thickness, excluding the above-noted projections, of about 5/32 inch. Lower skirt 126 is preferably provided in rolled form and is cut to length during installation. A continuous "cleat" 226 is preferably molded on the rear face of the skirt, approximately 1½ inches below the upper peripheral edge of lower skirt 126, as shown. Cleat 226 preferably acts as a guide to ensure quick, straight installation of lower skirt 126 to the base of the upper panels. In addition, cleat 226 preferably functions to further protect the upper panels from bottom-up impacts.

Lower skirt 126 is preferably capable of operating within a broad temperature range, preferably ranging between about −40-degrees Fahrenheit and about 300-degrees Fahrenheit. The resilient lower skirt 126 is preferably made of a flexible vulcanized plastic, more preferably a synthetic rubber such as SANOPRENE® sold by the U.S.-based Monsanto Company.

To reduce NOx, greenhouse gases, and improve fuel efficiency, legacy fleets can be retrofitted with the advanced aerodynamic trailer skirt 102. Alternately preferably, the skirt assemblies can be provided as new equipment options.

Physical Testing

Physical testing of aerodynamic skirt fairing 102 demonstrated average fuel savings of greater than about seven percent, when compared to baseline test vehicles operated without aerodynamic skirt fairing 102. Testing was undertaken by an independent agency in strict conformance with United States Environmental Protection Agency (EPA) testing guidelines.

The test utilized two new model-year 2011 Volvo tractors equipped with Cummins engines and Wabash "Duraplate" cargo trailers (104) having a length of 53 feet. The test provided a comparison between a cargo trailer fitted with aerodynamic skirt fairings 102 and one without. Aerodynamic skirt fairings 102 were located below the sides of the cargo trailer as illustrated in FIG. 1. Fuel consumption was measured by weighing an auxiliary fuel tank on each vehicle.

The test was run at the General Motors Proving Grounds in Yuma, Ariz. The vehicles were driven on the inner lane of the three and one half mile circle track an elevation of about 509 feet above sea level. The inner lane of the track was a paved concrete surface and has comprised a grade change of about 0.78 degrees. Testing began with an hour warm-up at 2:15 AM on the 23rd day of April with all runs being completed the same day. Weather data was recorded on site and comprised a temperature of 53.2 degrees Fahrenheit, humidity of 72 percent, wind speed of about 3 miles per hour and wind gusts of about 4.2 miles per hour.

Both the baseline and test portions were carried out according to the Society of Automotive Engineers (SAE) J1321 and the EPA SmartWay modifications. Twelve laps were driven at a speed of 65 MPH for a total of 41.6 miles and a run time of around 39 minutes. Both trucks started and stopped in the same location off the track where the fuel was weighed. The scale was leveled and calibrated with two 50-pound calibrated weights before the fuel was weighed before each run. Run times for each vehicle were measured using approved timers. During each run real-time data for engine speed, vehicle speed, coolant temperature, oil pressure, oil temperature, voltage, outside air pressure, and outside temperature were recorded for each lap. A total of four runs were required for each test to achieve the required data.

For the baseline test, the first run, with a ratio of 0.986, was not used. For the test runs the third run, with a ratio of 0.984, was not used. The averages for the baseline runs and test runs were 1.013 and 0.945 respectively. By using the calculations outlined in the SAE J1321 specification, the percentage fuel savings between the two tests were measured at 6.68 percent after aerodynamic skirt fairings 102 were added which equates to a 7.15 percentage improvement in fuel economy. Applicant's preferred embodiments described herein were shown to significantly exceed the minimum requirements for EPA SMARTWAY certification required for a Class-8 sleeper-cab tractor/trailer combination.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A side skirt system, relating to reducing aerodynamic drag below cargo trailers, comprising:
    a) a cargo trailer comprising a generally-rectilinear floor assembly having longitudinal sides, a longitudinal axis, a forward portion, a trailing portion, and having at least one rear wheel assembly situated below said generally-rectilinear floor;
    b) a plurality of generally-vertical support posts, said plurality located generally below a said longitudinal side; and
    c) a set of generally-vertical side-skirt wall panels;
    d) wherein each respective generally-vertical support post of said plurality comprises a respective upper end;
    e) wherein each such respective generally-vertical support post is coupled only adjacent, at said respective upper end, with said generally-rectilinear floor assembly;
    f) wherein each such respective generally-vertical support post is coupled below said upper end to at least one of said set of generally-vertical side-skirt wall panels;
    g) wherein at least two of said generally-vertical support posts of said plurality of generally-vertical support posts and at one of said set of generally-vertical side-skirt wall panels are located along a path from said forward portion to said trailing portion;
    h) wherein such path proceeds outwardly, relative to said longitudinal axis, from said forward portion to said trailing portion to a location adjacent and forward of said rear wheel assembly;
    i) wherein interaction of airflow below said cargo trailer, when moving forward, with said set of generally-vertical side-skirt wall panels reduces aerodynamic drag of said cargo trailer;
    j) at least one adjustable attacher structured and arranged to adjustably attach said generally-vertical support post to said generally-rectilinear floor;
    k) wherein each such respective generally-vertical support post is configured to assist upward and inward pivoting of at least one of said set of generally-vertical side-skirt wall panels;
    l) wherein impact damage of said set of generally-vertical side-skirt wall panels may be reduced by such upward and inward pivoting;
    m) wherein such respective generally-vertical support post further comprises at least one positional biaser structured and arranged to positionally bias such respective generally-vertical support post into at least one generally-vertical position;
    n) wherein said set of generally-vertical side-skirt wall panels are positionally biased toward at least one useful aerodynamic rest-position;
    o) wherein said at least one adjustable attacher comprises at least one vertical-axis rotator configured to allow rotation of said generally-vertical support post about a generally-vertical axis; and
    p) wherein said at least one vertical-axis rotator comprises at least one positional maintainer structured and arranged to maintain such respective generally-vertical support post in at least one defined rotational position about such generally-vertical axis.

2. The side skirt system according to claim 1 wherein said at least one adjustable attacher further comprises at least one clamping assembly structured and arranged to assist adjustable clamping of said generally-vertical support post to at least one floor support member of said generally-rectilinear floor.

3. The side skirt system according to claim 1 wherein said at least one adjustable attacher comprises:
    a) at least one mounting plate structured and arranged to assist mounted engagement of said generally-vertical support post with said generally-rectilinear floor; and
    b) at least one threaded-shaft tensioner structured and arranged to tension said at least one mounting plate toward such mounted engagement;
    c) wherein said at least one mounting plate comprises at least one slotted aperture structured and arranged to receive said at least one threaded-shaft tensioner.

4. The side skirt system according to claim 1 wherein said at least one positional biaser comprises at least one spring.

5. The side skirt system according to claim 1 wherein said generally-vertical support post comprises at least one channel having at least one mounting flange structured and arranged to assist connection of at least one of said set of generally-vertical side-skirt wall panels to such respective generally-vertical support post.

6. A side skirt system, relating to reducing aerodynamic drag of cargo trailers, such cargo trailer comprising a generally-rectilinear floor assembly having longitudinal sides, a longitudinal axis, a forward portion, a trailing portion, and having at least one rear wheel assembly situated below said generally-rectilinear floor, said system comprising:
  a) at least two generally-vertical support posts, each said generally-vertical support post being configured to be located generally below at least one of such longitudinal sides; and
  b) a set of generally-vertical side-skirt wall panels;
  c) wherein each said generally-vertical support post comprises an upper end configured to be coupled with such generally-rectilinear floor assembly;
  d) wherein each said generally-vertical support post is configured to be coupled below said upper end to at least one of said set of generally-vertical side-skirt wall panels;
  e) wherein said at least two generally-vertical support posts and at one of said set of generally-vertical side-skirt wall panels are configured to be located along a path, proceeding outwardly relative to such longitudinal side, from such forward portion to such trailing portion, to a location adjacent and forward of such rear wheel assembly;
  f) wherein such side skirt system, when assembled with such cargo trailer, assists in reducing aerodynamic drag of such cargo trailer; and
  g) at least one adjustable attacher structured and arranged to adjustably attach said generally-vertical support post to at least one floor support member of such generally-rectilinear floor;
  h) wherein said at least one adjustable attacher comprises:
    i) at least one mounting plate structured and arranged to assist coupling of said generally-vertical support post with at least one flanged portion of such at least one floor support member; and
    ii) at least one threaded-shaft tensioner structured and arranged to tension said at least one mounting plate to assist such coupling;
    iii) wherein said at least one mounting plate comprises at least one slotted aperture structured and arranged to receive said at least one threaded-shaft tensioner.

7. The side skirt system according to claim 6 wherein:
  a) each said generally-vertical support post comprises at least one horizontal-axis rotator configured, when assembled, to assist upward and inward pivoting of at least one of said set of generally-vertical side-skirt wall panels about at least one generally-horizontal axis; and
  b) impact damage of said set of generally-vertical side-skirt wall panels, when assembled, may be reduced.

8. The side skirt system according to claim 7 wherein said generally-vertical support post further comprises at least one positional biaser structured and arranged to positionally bias, when assembled, said generally-vertical support post into at least one generally-vertical position.

9. The side skirt system according to claim 8 wherein said at least one adjustable attacher comprises at least one vertical-axis rotator configured to allow rotation, when assembled, of said generally-vertical support post about a generally-vertical axis.

10. The side skirt system according to claim 9 wherein said at least one vertical-axis rotator, when assembled, comprises at least one positional maintainer structured and arranged to maintain said generally-vertical support post in at least one defined rotational position about such generally-vertical axis.

11. The side skirt system according to claim 8 wherein said at least one positional biaser comprises at least one spring.

12. The side skirt system according to claim 6 wherein said generally-vertical support post comprises at least one channel having at least one mounting flange configured to assist connection of at one of said set of generally-vertical side-skirt wall panels to said generally-vertical support post.

13. The side skirt system, according to claim 9, wherein said at least one mounting plate and said at least one threaded-shaft tensioner are configured to form at least one clamping assembly structured and arranged to assist, when assembled, adjustable clamping of said generally-vertical support post to such at least one floor support member of such generally-rectilinear floor.

14. The side skirt system, according to claim 13 wherein said at least one vertical-axis rotator comprises:
  a) at least one clamping assembly comprising:
    i) at least one first mounting plate and at least one second mounting plate,
    ii) at least one first threaded-shaft tensioner structured and arranged to threadably tension said at least one first mounting plate to at least one first clamped engagement with at least one floor support member, and
    iii) at least one second threaded-shaft tensioner structured and arranged to threadably tension said at least one second mounting plate to at least one second clamped engagement such at least one floor support member;
  b) wherein said at least one first threaded-shaft tensioner is structured and arranged to comprise at least one hinge position with respect to said at least one second threaded-shaft tensioner;
  c) wherein said at least one second threaded-shaft tensioner is structured and arranged to pivot with respect to said at least one hinge position; and
  d) wherein pivotal positioning of said at least one second threaded-shaft tensioner with respect to said first threaded-shaft tensioner assists, when assembled, such rotation of said generally-vertical support post about such at least one vertical rotational axis.

15. The side skirt system, according to claim 14, wherein:
  a) said at least one slotted aperture is configured to receive said at least one second threaded-shaft tensioner;
  b) said at least one slotted aperture comprises at least one aperture area no less than 110% of an area of a cross section of a threaded section of said second threaded-shaft tensioner; and
  c) said at least one slotted aperture assists such pivoting of said second threaded-shaft tensioner with respect to said at least one hinge position.

16. The side skirt system, according to claim 7, wherein said at least one horizontal-axis rotator comprises:
  a) at least one pivot bar oriented generally coaxially with the generally-horizontal rotational axis; and
  b) at least one helical-type torsion spring structured and arranged to apply at least one spring force to bias said generally-vertical support post toward at least one position orienting said set of generally-vertical side-skirt wall panels, when assembled, in the at least one generally-vertical position;
  c) wherein said generally-vertical support post comprises at least one channel having at least one mounting flange structured and arranged to assist connection of at one of said set of generally-vertical side-skirt wall panels to said generally-vertical support post; and d) wherein said at least one channel is pivotally engaged on said at least one pivot bar.

17. The side skirt system according to claim 7 further comprising at least one rotational adjuster structured and arranged to assist rotational adjustment, when assembled, of said generally-vertical support post, about the at least one generally-horizontal axis, to such at least one generally-vertical position.

18. The side skirt system according to claim 17 wherein said at least one support-rotator adjuster further comprises:

a) at least one threaded member threadably engaged within said at least one channel;
b) wherein a rotation of said at least one threaded member produces at least one rotational adjustment, when assembled, of said at least one channel about the generally-horizontal rotational axis; and
c) wherein such at least one rotational adjustment of said at least one channel, when assembled, assists in optimizing placement of said set of generally-vertical side-skirt wall panels in the at least one generally-vertical position by angular adjustment.

19. The side skirt system according to claim 6 wherein said set of generally-vertical side-skirt wall panels comprises at least one planar panel structured and arranged, when assembled, to direct air passing adjacent the cargo trailer away from the at least one rear wheel assembly.

20. The side skirt system according to claim 17 wherein said set of generally-vertical side-skirt wall panels further comprise:

a) at least three planar panels, each one structured and arranged, when assembled, to be supported from the generally-rectilinear floor assembly by at least two of said generally-vertical support posts;
b) wherein, when assembled, said at least three planar panels, when supported in series, direct a flow of air passing adjacent the cargo trailer away from the at least one rear wheel assembly.

21. The side skirt system according to claim 19 further comprising:

a) at least one resilient deflection-member structured and arranged to resiliently deflect under force-loading;
b) wherein, when assembled, said at least one resilient deflection-member extends generally continuously along a bottom portion of said at least one planar panel.

22. The side skirt system according to claim 21 wherein said at least one resilient deflection-member further comprises at least one synthetic rubber comprising at least one air-smoothing projection structured and arranged, when assembled, to assist in smoothing airflow along the surface of said at least one resilient deflection-member.

23. The side skirt system according to claim 20 further comprising the cargo trailer comprising a generally-rectilinear floor assembly having longitudinal sides, a longitudinal axis, a forward portion, a trailing portion, and having at least one rear wheel assembly situated below said generally-rectilinear floor.

24. The side skirt system according to claim 21 further comprising two non-intersecting sets of generally-vertical side-skirt wall panels, each such respective set of generally-vertical side-skirt wall panels located below a respective one of said longitudinal sides.

25. A side skirt system, relating to reducing aerodynamic drag of cargo trailers, such cargo trailer comprising a generally-rectilinear floor assembly having longitudinal sides, a longitudinal axis, a forward portion, a trailing portion, and having at least one rear wheel assembly situated below said generally-rectilinear floor, said system comprising:

a) ;
b) a plurality of generally-vertical support posts, said plurality located generally below a said longitudinal side; and
c) a set of generally-vertical side-skirt wall panels;
d) wherein each respective generally-vertical support post of said plurality comprises a respective upper end;
e) wherein each such respective generally-vertical support post is coupled only adjacent, at said respective upper end, with said generally-rectilinear floor assembly;
f) wherein each such respective generally-vertical support post is coupled below said upper end to at least one of said set of generally-vertical side-skirt wall panels;
g) wherein at least two of said generally-vertical support posts of said plurality of generally-vertical support posts and at one of said set of generally-vertical side-skirt wall panels are located along a path from said forward portion to said trailing portion;
h) wherein such path proceeds outwardly, relative to said longitudinal axis, from said forward portion to said trailing portion to a location adjacent and forward of said rear wheel assembly;
i) wherein each such respective generally-vertical support post is configured to assist upward and inward pivoting of at least one of said set of generally-vertical side-skirt wall panels to reduce impact damage;
j) wherein such respective generally-vertical support post further comprises at least one positional biaser structured and arranged to positionally bias such respective generally-vertical support post into at least one generally-vertical position and wherein said at least one positional biaser comprises at least one spring;
k) wherein said upper end comprises at least one adjustable attacher structured and arranged to adjustably attach said generally-vertical support post to said generally-rectilinear floor;
l) wherein said at least one adjustable attacher comprises at least one vertical-axis rotator configured to allow rotation of said generally-vertical support post about a generally-vertical axis;
m) wherein said at least one vertical-axis rotator comprises at least one positional maintainer structured and arranged to maintain such respective generally-vertical support post in at least one defined rotational position about such generally-vertical axis;
n) wherein said at least one adjustable attacher comprises:
   i) at least one mounting plate structured and arranged to assist mounted engagement of said generally-vertical support post with said generally-rectilinear floor, and
   ii) at least one threaded-shaft tensioner structured and arranged to tension said at least one mounting plate toward such mounted engagement;
o) wherein said at least one mounting plate comprises at least one slotted aperture structured and arranged to receive said at least one threaded-shaft tensioner;
p) wherein said generally-vertical support post comprises at least one channel having at least one mounting flange structured and arranged to assist connection of at least one of said set of generally-vertical side-skirt wall panels to such respective generally-vertical support post; and
q) wherein said at least one mounting plate and said at least one threaded-shaft tensioner are configured to form at least one clamping assembly structured and arranged to assist, when assembled, adjustable clamping of said generally-vertical support post to such at least one floor support member of such generally-rectilinear floor.

26. The side skirt system according to claim 25, further comprising the cargo trailer comprising a generally-rectilinear floor assembly having longitudinal sides, a longitudinal axis, a forward portion, a trailing portion, and having at least one rear wheel assembly situated below said generally-rectilinear floor.

27. The side skirt system, according to claim 15, wherein said at least one slotted aperture comprises at least one generally-arcuate shape.

28. A side skirt system, relating to reducing aerodynamic drag of cargo trailers, such cargo trailer comprising a generally-rectilinear floor assembly having longitudinal sides, a longitudinal axis, a forward portion, a trailing portion, and having at least one rear wheel assembly situated below said generally-rectilinear floor, said system comprising:
 a) at least two generally-vertical support posts, each said generally-vertical support post being configured to be located generally below at least one of such longitudinal sides; and
 b) a set of generally-vertical side-skirt wall panels;
 c) wherein each said generally-vertical support post comprises an upper end configured to be coupled with such generally-rectilinear floor assembly, and at least one horizontal-axis rotator;
 d) wherein each said generally-vertical support post is configured to be coupled below said upper end to at least one of said set of generally-vertical side-skirt wall panels;
 e) wherein said at least two generally-vertical support posts and at one of said set of generally-vertical side-skirt wall panels are configured to be located along a path, proceeding outwardly relative to such longitudinal side, from such forward portion to such trailing portion, to a location adjacent and forward of such rear wheel assembly;
 f) wherein such side skirt system, when assembled with such cargo trailer, assists in reducing aerodynamic drag of such cargo trailer; and
 g) wherein said at least one horizontal-axis rotator comprises:
  i) at least one pivot bar oriented generally coaxially with the generally-horizontal rotational axis;
  ii) at least one helical-type torsion spring structured and arranged to apply at least one spring force to bias said generally-vertical support post toward at least one position orienting said set of generally-vertical side-skirt wall panels, when assembled, in the at least one generally-vertical position;
  iii) wherein said generally-vertical support post comprises at least one channel having at least one mounting flange structured and arranged to assist connection of at one of said set of generally-vertical side-skirt wall panels to said generally-vertical support post; and
  iv) wherein said at least one channel is pivotally engaged on said at least one pivot bar.

29. The side skirt system, according to claim 28, wherein said upper end comprises at least one adjustable attacher structured and arranged to adjustably attach said generally-vertical support post to at least one floor support member of such generally-rectilinear floor, further comprising:
 a) at least one mounting plate structured and arranged to assist coupling of said generally-vertical support post with at least one flanged portion of such at least one floor support member; and
 b) at least one threaded-shaft tensioner structured and arranged to tension said at least one mounting plate to assist such coupling;
 c) wherein said at least one mounting plate comprises at least one enlarged aperture structured and arranged to receive said at least one threaded-shaft tensioner;
 d) wherein said at least one enlarged aperture comprises at least one aperture area no less than 110% of an area of a cross section of a threaded section of said threaded-shaft tensioner; and
 e) wherein said at least one enlarged aperture assists such pivoting of said threaded-shaft tensioner with respect to said at least one hinge position.

30. A side skirt system, relating to reducing aerodynamic drag of cargo trailers, such cargo trailer comprising a generally-rectilinear floor assembly having longitudinal sides, a longitudinal axis, a forward portion, a trailing portion, and having at least one rear wheel assembly situated below said generally-rectilinear floor, said system comprising:
 a) at least two generally-vertical support posts, each said generally-vertical support post being configured to be located generally below at least one of such longitudinal sides;
 b) at least one adjustable attacher structured and arranged to adjustably attach said generally-vertical support post to at least one floor support member of such generally-rectilinear floor; and
 c) a set of generally-vertical side-skirt wall panels;
 d) wherein each said generally-vertical support post comprises an upper end configured to be coupled with such generally-rectilinear floor assembly;
 e) wherein each said generally-vertical support post is configured to be coupled below said upper end to at least one of said set of generally-vertical side-skirt wall panels;
 f) wherein said at least two generally-vertical support posts and at one of said set of generally-vertical side-skirt wall panels are configured to be located along a path, proceeding outwardly relative to such longitudinal side, from such forward portion to such trailing portion, to a location adjacent and forward of such rear wheel assembly;
 g) wherein such side skirt system, when assembled with such cargo trailer, assists in reducing aerodynamic drag of such cargo trailer;
 h) wherein said at least one adjustable attacher comprises at least one vertical-axis rotator configured to allow rotation, when assembled, of said generally-vertical support post about a generally-vertical axis; and
 i) wherein said at least one vertical-axis rotator, when assembled, comprises at least one positional maintainer structured and arranged to maintain said generally-vertical support post in at least one defined rotational position about such generally-vertical axis.

31. The side skirt system, according to claim 30, wherein said at least one adjustable attacher further comprises:
 a) at least one mounting plate structured and arranged to assist coupling of said generally-vertical support post with at least one flanged portion of such at least one floor support member; and
 b) at least one threaded-shaft tensioner structured and arranged to tension said at least one mounting plate to assist such coupling;
 c) wherein said at least one mounting plate comprises at least one enlarged aperture structured and arranged to receive said at least one threaded-shaft tensioner;

d) wherein said at least one enlarged aperture comprises at least one aperture area no less than 110% of an area of a cross section of a threaded section of said threaded-shaft tensioner; and e) wherein said at least one enlarged aperture assists such pivoting of said threaded-shaft tensioner with respect to said at least one hinge position.

32. A side skirt system, relating to reducing aerodynamic drag of cargo trailers, such cargo trailer comprising a generally-rectilinear floor assembly having longitudinal sides, a longitudinal axis, a forward portion, a trailing portion, and having at least one rear wheel assembly situated below said generally-rectilinear floor, said system comprising:

a) at least two generally-vertical support posts, each said generally-vertical support post being configured to be located generally below at least one of such longitudinal sides;

b) a set of generally-vertical side-skirt wall panels; and c) at least one resilient deflection-member structured and arranged to resiliently deflect under force-loading;

d) wherein, when assembled, said at least one resilient deflection-member extends generally continuously along a bottom portion of said at least one planar panel;

e) wherein each said generally-vertical support post comprises an upper end configured to be coupled with such generally-rectilinear floor assembly;

f) wherein each said generally-vertical support post is configured to be coupled below said upper end to at least one of said set of generally-vertical side-skirt wall panels;

g) wherein said at least two generally-vertical support posts and at one of said set of generally-vertical side-skirt wall panels are configured to be located along a path, proceeding outwardly relative to such longitudinal side, from such forward portion to such trailing portion, to a location adjacent and forward of such rear wheel assembly;

h) wherein such side skirt system, when assembled with such cargo trailer, assists in reducing aerodynamic drag of such cargo trailer;

i) wherein said set of generally-vertical side-skirt wall panels comprises at least one planar panel structured and arranged, when assembled, to direct air passing adjacent the cargo trailer away from the at least one rear wheel assembly; and j) wherein said at least one resilient deflection-member further comprises at least one synthetic rubber comprising at least one air-smoothing projection structured and arranged, when assembled, to assist in smoothing airflow along the surface of said at least one resilient deflection-member.

33. The side skirt system, according to claim 32, wherein said upper end comprises at least one adjustable attacher structured and arranged to adjustably attach said generally-vertical support post to at least one floor support member of such generally-rectilinear floor, further comprising:

a) at least one mounting plate structured and arranged to assist coupling of said generally-vertical support post with at least one flanged portion of such at least one floor support member; and b) at least one threaded-shaft tensioner structured and arranged to tension said at least one mounting plate to assist such coupling;

c) wherein said at least one mounting plate comprises at least one enlarged aperture structured and arranged to receive said at least one threaded-shaft tensioner;

d) wherein said at least one enlarged aperture comprises at least one aperture area no less than 110% of an area of a cross section of a threaded section of said threaded-shaft tensioner; and e) wherein said at least one enlarged aperture assists such pivoting of said threaded-shaft tensioner with respect to said at least one hinge position.

* * * * *